United States Patent
Wang et al.

(10) Patent No.: US 11,358,662 B2
(45) Date of Patent: Jun. 14, 2022

(54) IDLER WHEEL AND METHOD FOR MANUFACTURING IDLER WHEEL

(71) Applicant: KOMATSU LTD., Tokyo (JP)

(72) Inventors: Tao Wang, Tokyo (JP); Kenichi Hisamatsu, Tokyo (JP); Minoru Katayama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 826 days.

(21) Appl. No.: 16/245,566

(22) Filed: Jan. 11, 2019

(65) Prior Publication Data
US 2019/0233031 A1      Aug. 1, 2019

(30) Foreign Application Priority Data
Jan. 26, 2018   (JP) .............................. JP2018-011453

(51) Int. Cl.
  *B62D 55/14*    (2006.01)
  *B62D 55/092*   (2006.01)
  *B62D 55/30*    (2006.01)
  *B62D 55/15*    (2006.01)

(52) U.S. Cl.
  CPC .......... *B62D 55/14* (2013.01); *B62D 55/092* (2013.01); *B62D 55/15* (2013.01); *B62D 55/30* (2013.01)

(58) Field of Classification Search
  CPC ........ B62D 55/14; B62D 55/15; B62D 55/30; B62D 55/32; B62D 55/092
  See application file for complete search history.

(56) References Cited

U.S. PATENT DOCUMENTS

| | | | | |
|---|---|---|---|---|
| 3,842,475 A | * | 10/1974 | Clasper | B21D 53/26 228/113 |
| 3,915,511 A | * | 10/1975 | Clasper | B60B 3/08 474/197 |
| 6,428,114 B1 | * | 8/2002 | Sebode | B60B 1/06 301/64.102 |
| 9,550,536 B2 | | 1/2017 | Johannsen et al. | |
| 2018/0072358 A1 | * | 3/2018 | Vik | B62D 55/088 |

FOREIGN PATENT DOCUMENTS

| | | | | |
|---|---|---|---|---|
| DE | 2645523 B | * | 4/1978 | ............ B60B 11/02 |
| RU | 2635814 C1 | * | 11/2017 | |

* cited by examiner

*Primary Examiner* — Kip T Kotter
(74) *Attorney, Agent, or Firm* — Global IP Counselors, LLP

(57) ABSTRACT

With an idler, a first member includes a first boss portion, a first rim portion, and a side plate. A second member includes a second boss portion, a second rim portion, and a side plate. A third member includes a third boss portion having a third axle hole portion configured to allow insertion of an axle. The third boss portion is disposed between the first boss portion and the second boss portion. A first welded portion is formed between the second boss portion and the third boss portion and connects the second and third boss portions. A second welded portion is formed between the first boss portion and the third boss portion and connects the first and third boss portions. A third welded portion is formed between the first rim portion and the second rim portion and connects the first and second rim portions.

12 Claims, 11 Drawing Sheets

IDLER WHEEL AND METHOD FOR MANUFACTURING IDLER WHEEL

CROSS-REFERENCE TO RELATED APPLICATIONS

This application claims priority under 35 U.S.C. § 119 to Japanese Patent Application No. 2018-011453 filed on Jan. 26, 2018. The entire disclosure of Japanese Patent Application JP 2018-011453 is hereby incorporated herein by reference.

BACKGROUND

Technical Field

The present invention relates to an idler wheel used in a track-type drive unit, and to a method for manufacturing an idler wheel.

Description of the Related Art

Conventionally, a track-type drive unit is provided with drive wheel and idler wheels for rotating an endless track chain. An idler wheel used for large, heavy-duty applications has a rim, a side plate, and a boss which are separate members. The idler wheel is manufactured by welding a rim (a separate member) and a side plate to a boss (see, for example, FIGS. 1 and 2 of U.S. Pat. No. 9,550,536).

With the idler wheel shown in U.S. Pat. No. 9,550,536, the inner peripheral end of the side plate is welded to the boss, and the outer peripheral end of the side plate is welded to the rim. Also, the boss is divided up into two parts, and the idler wheel is manufactured by welding at a total of five places.

SUMMARY

However, since the welded portions of the idler wheel shown in U.S. Pat. No. 9,550,536 are provided at the end of the idler wheel side plate, when a force is exerted in the axle direction, the welded portions on the inner peripheral end side of the side plate tend to be subjected to a load, so the thickness of the members and the length of the welded leg need to be increased to ensure the required strength. Therefore, the idler wheel becomes heavier and the cost is higher.

It is an object of the present invention to provide an idler wheel with which the load exerted on the welded portions can be reduced with respect to the force in the axle direction, as well as a method for manufacturing an idler wheel.

The idler wheel according to this invention comprises a first member, a second member, a third member, a first welded portion, a second welded portion, and a third welded portion. The first member has a first support portion, a first outer peripheral portion, and a first side plate. The first support portion has a first support hole configured to allow insertion of an axle. The first outer peripheral portion is formed in an annular shape around the first support hole on the outside in the radial direction of the first support portion. The first side plate connects the first outer peripheral portion and the first support portion. The second member has a second support portion, a second outer peripheral portion, and a second side plate. The second support portion has a second support hole configured to allow insertion of the axle. The second outer peripheral portion is formed in an annular shape around the second support hole on the outside in the radial direction of the second support portion. The second side plate connects the second outer peripheral portion and the second support portion, and is disposed opposite the first side plate. The third member has a third support portion that has a third support hole configured to allow insertion of the axle, and that is disposed between the first support portion and the second support portion. The first welded portion is formed between the second support portion and the third support portion and connects the second support portion and the third support portion. The second welded portion is formed between the first support portion and the third support portion, and connects the first support portion and the third support portion. The third welded portion is formed between the first outer peripheral portion and the second outer peripheral portion, and connects the first outer peripheral portion and the second outer peripheral portion.

The method for manufacturing an idler wheel according to this invention comprises a first welding step, a second welding step, and a third welding step. The idler wheel has a first member, a second member, and a third member. The first member has a first support portion, a first outer peripheral portion, and a first side plate. The first support portion is provided to the support component. The support component has a support hole configured to allow insertion of an axle. The first outer peripheral portion is provided to the outer peripheral part. The outer peripheral part is formed in an annular shape around the support hole on the outside of the support component. The first side plate connects the first outer peripheral portion and the first support portion. The second member has a second support portion, a second outer peripheral portion, and a second side plate. The second support portion is provided to the support component. The second outer peripheral portion is provided to the outer peripheral part. The second side plate connects the second outer peripheral portion and the second support portion, and is disposed opposite the first side plate in the direction running along the center axis of the support hole. The third member is provided to the support component, and has a third support portion disposed between the first support portion and the second support portion. In the first welding step, the second member and the third member are welded between the second support portion and the third support portion. In the second welding step, the first member and the third member are welded between the first support portion and the third support portion. In the third welding step, the first member and the second member are welded between the first outer peripheral portion and the second outer peripheral portion.

The present invention provides an idler wheel and a method for manufacturing an idler wheel, with which the load exerted on welded portions with respect to force in an axle direction can be reduced.

DETAILED DESCRIPTION OF THE EMBODIMENT(S)

An idler as an example of the idler wheel of the present invention will now be described through reference to the drawings.

Embodiment 1

The idler in Embodiment 1 according to the present invention will now be described.

1. Configuration 1-1. Overall Summary of Hydraulic Excavator 100

Figure 1:
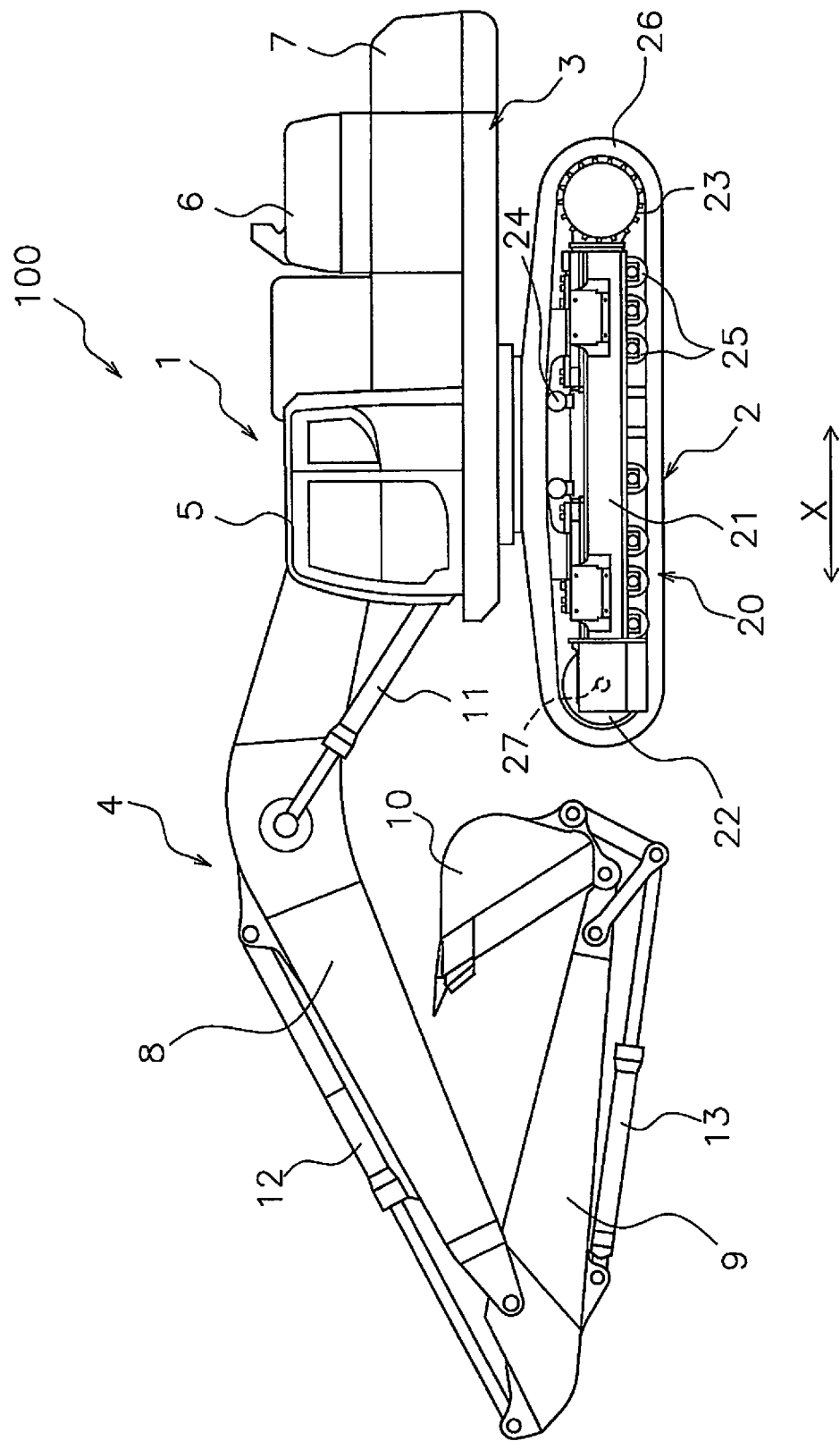
FIG. 1 is a side view of the configuration of a hydraulic excavator equipped with idlers in a first embodiment of the present invention.

FIG. 1 is a diagram of the hydraulic excavator 100 in this embodiment. The hydraulic excavator 100 has a vehicle body 1 and a work implement 4.

The vehicle body 1 has a traveling unit 2 and a revolving unit 3. The traveling unit 2 has a pair of track-type drive units 20, and the track-type drive units 20 are driven by drive force from an engine, causing the hydraulic excavator 100 to travel.

The revolving unit 3 is mounted on the traveling unit 2 so as to be able to revolve. The revolving unit 3 has a cab 5, a housing 6, a counterweight 7, and so on. The cab 5 (serves as the operator's compartment) is provided at the left-front side of the revolving unit 3. The housing 6 is provided on the rear side of the cab 5 and houses an engine, a radiator, a radiator fan, and so forth. The counterweight 7 is disposed to the rear of the revolving unit 3. In the description of this specification, "upper," "lower," "front," "rear," "left," and "right" are terms used with respect to the operator seated in the driver's seat of the cab 5.

The work implement 4 has a boom 8, an arm 9, an excavating bucket 10, and the like, and is attached at a front-center position of the revolving unit 3. The proximal end portion of the boom 8 is rotatably linked to the revolving unit 3. The proximal end of the arm 9 is rotatably linked to the distal end of the boom 8. The excavating bucket 10 is rotatably linked to the distal end of the arm 9. In addition, hydraulic cylinders 11, 12, and 13 are provided so as to correspond to the boom 8, the arm 9, and the excavating bucket 10, and the work implement 4 is driven by the expansion and contraction of the hydraulic cylinders 11, 12, and 13.

1-2. Traveling Unit 2

The traveling unit 2 has a pair of track-type drive units 20 on the left and right. Each of the track-type drive units 20 has a track frame 21, an idler 22, a sprocket 23, a plurality of upper rollers 24, a plurality of lower rollers 25, and a crawler belt 26.

The track frame 21 is disposed along the vehicle longitudinal direction. The idler 22 is rotatably supported at the front end of the track frame 21. The sprocket 23 is fixed to the rear end of the track frame 21. The upper rollers 24 are rotatably provided to the upper part of the track frame 21. The lower rollers 25 are rotatably provided to the lower part of the track frame 21. The crawler belt 26 is wrapped around the idler 22, the sprocket 23, the upper rollers 24, and the lower rollers 25.

1-3. Idler 22

The idler 22 is an idler wheel, and is rotatably disposed on an axle 27 provided to the track frame 21.

Figure 2:
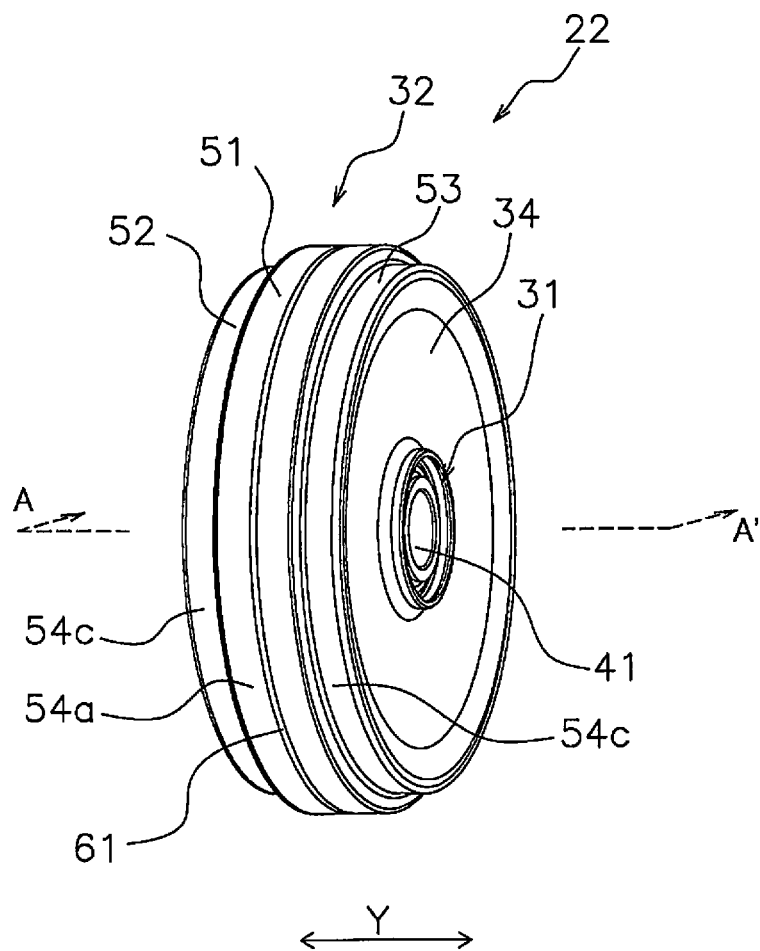
FIG. 2 is an oblique view of the idler in FIG. 1.
Figure 3A:
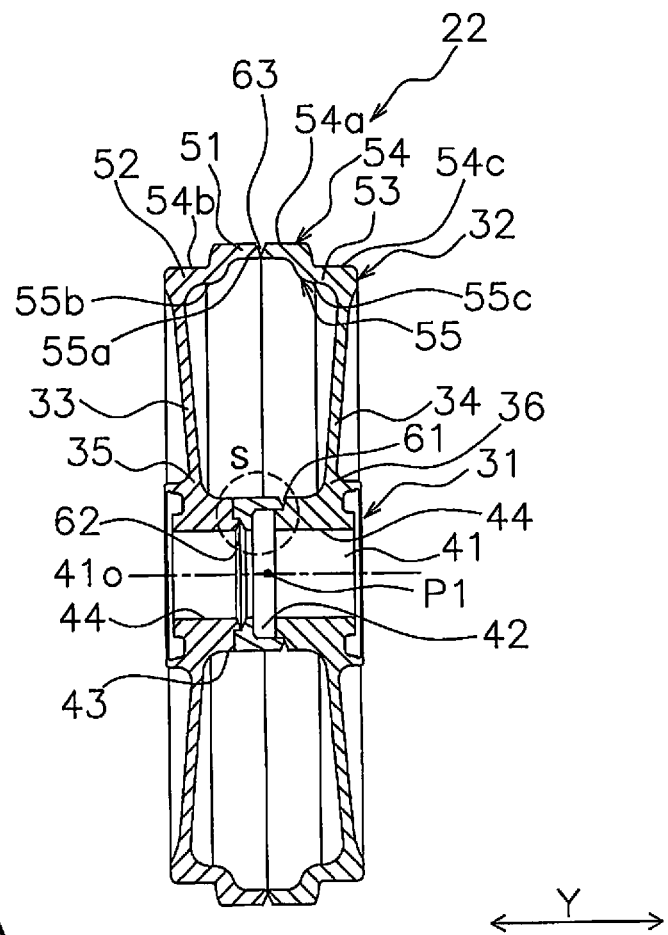
FIG. 3A is a cross section along line A-A' in FIG. 2.

FIG. 2 is an oblique view of the idler 22. FIG. 3A is a cross section along the A-A' line in FIG. 2.

The idler 22 is substantially disk-shaped, and has a boss 31, a rim 32, and a pair of side plates 33 and 34.

1-3-1. Boss 31

The boss 31 is cylindrical and supports the axle 27. The boss 31 has an axle hole 41 and an oil reservoir 42. The axle 27 is inserted into the axle hole 41. In a state in which the idler 22 has been attached to the track-type drive unit 20, the axle hole 41 is disposed running in the left and right direction. Lubricating oil is held in the oil reservoir 42. This lubricating oil reduces friction as the idler 22 rotates with respect to the axle 27.

Figure 3B:
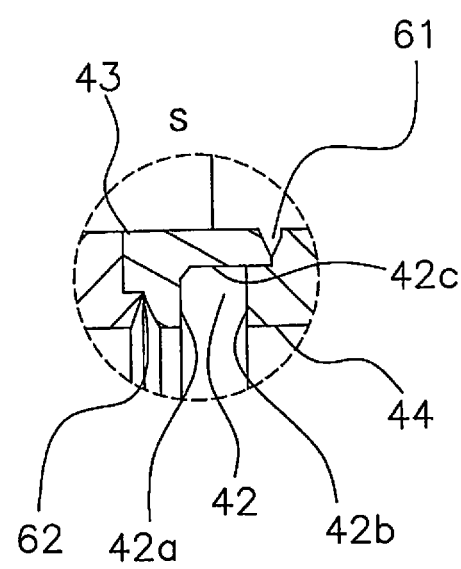
FIG. 3B is an enlarged view of an oil reservoir in FIG. 3A.

The oil reservoir 42 is formed in the inner peripheral face 44 of the axle hole 41. The oil reservoir 42 is formed running in the circumferential direction centered on the center axis 41o of the axle hole 41. As shown in the S detail view in FIG. 3B, the oil reservoir 42 has opposing inner side faces 42a and 42b and a bottom face 42c. In FIG. 3B, the inner side face 42a is positioned on the left side and the inner side face 42b is positioned on the right side. The bottom face 42c is formed running along the center axis 41o.

1-3-2. Rim 32

The rim 32 forms the disk-shaped outer peripheral face of the idler 22. The rim 32 is formed outside the boss 31 in a cylindrical shape centered on the center axis 41o of the axle hole 41. The outer peripheral face 54 and the inner peripheral face 55 of the rim 32 are formed running substantially along the center axis 41o of the axle hole 41, but a step is formed by a convex portion 51. The rim 32 has the convex portion 51, a contact portion 52, and a contact portion 53. The convex portion 51 is formed outward with the axle hole 41 as the center. The convex portion 51 is formed at the center in the left and right direction (the arrow Y direction) in a state of being attached to the track-type drive unit 20. The convex portion 51 is formed all the way around the periphery in the circumferential direction.

The contact portion 52 and the contact portion 53 are disposed on both sides in the left and right direction Y of the convex portion 51. The outer peripheral face portion 54b corresponding to the contact portion 52 of the outer peripheral face 54 of the rim 32 and the outer peripheral face portion 54c corresponding to the contact portion 53 come into contact with the tread surfaces of the pairs of track links of the crawler belt 26. The outer peripheral face portions 54b and 54c are located closer to the axle hole 41 than the outer peripheral face portion 54a, which is the distal end face on the outside of the convex portion 51. The inner peripheral face portion 55a corresponding to the convex portion 51 of the inner peripheral face 55 is located further outside than the inner peripheral face portions 55b and 55c of the inner peripheral face 55 corresponding to the contact portion 52 and the contact portion 53.

1-3-3. Side Plates 33 and 34

The side plates 33 and 34 form the left and right faces of the idler 22 in a state of being attached to the track-type drive unit 20. The side plates 33 and 34 connect the boss 31 and the rim 32. The side plate 33 and the side plate 34 are disposed opposite each other in the direction of the center axis 41o. The side plate 33 connects the area near the left end of the boss 31 and the area near the left end of the rim 32. The side plate 34 connects the area near the right end of the boss 31 and the area near the right end of the rim 32. A cavity is formed between the side plate 33 and the side plate 34.

The oil reservoir 42 is provided between a connecting portion 35 to which the boss 31 and the side plate 33 are connected, and a connecting portion 36 to which the boss 31 and the side plate 34 are connected.

1-3-4. First Welded Portion, Second Welded Portion, Third Welded Portion

The first welded portion 61, the second welded portion 62, and the third welded portion 63 formed in the manufacture of the idler 22 will be described here, but are described in detail in the manufacturing method discussed below. In FIG. 3A, only the groove is shown as the welded portion in order to make the drawing easier to understand.

The idler 22 is formed by welding three members: a first member 71, a second member 72, and a third member 73.

The boss 31 is divided into three parts in the direction of the center axis 41o, and is formed by welding at the first welded portion 61 and the second welded portion 62. The first welded portion 61 is formed on the outer peripheral face 43 side of the boss 31 and near the inner side face 42b of the oil reservoir 42. The second welded portion 62 is formed on the inner peripheral face 44 side of the boss 31 and near the inner side face 42a of the oil reservoir 42.

As shown in FIG. 3A, the second welded portion 62 is provided closer to the end than the center position P1 in the direction of the center axis 41o of the axle hole 41.

Consequently, in welding the second welded portion 62 from the inside of the axle hole 41, the distance from the opening of the axle hole 41 is shorter, so the welding can be performed more easily.

The rim 32 is divided in its approximate center in the left and right direction Y of the convex portion 51, and the first welded portion 61 is formed on the outer peripheral face portion 54a side of the convex portion 51.

1-3-5. First Member, Second Member, Third Member

Figure 4:
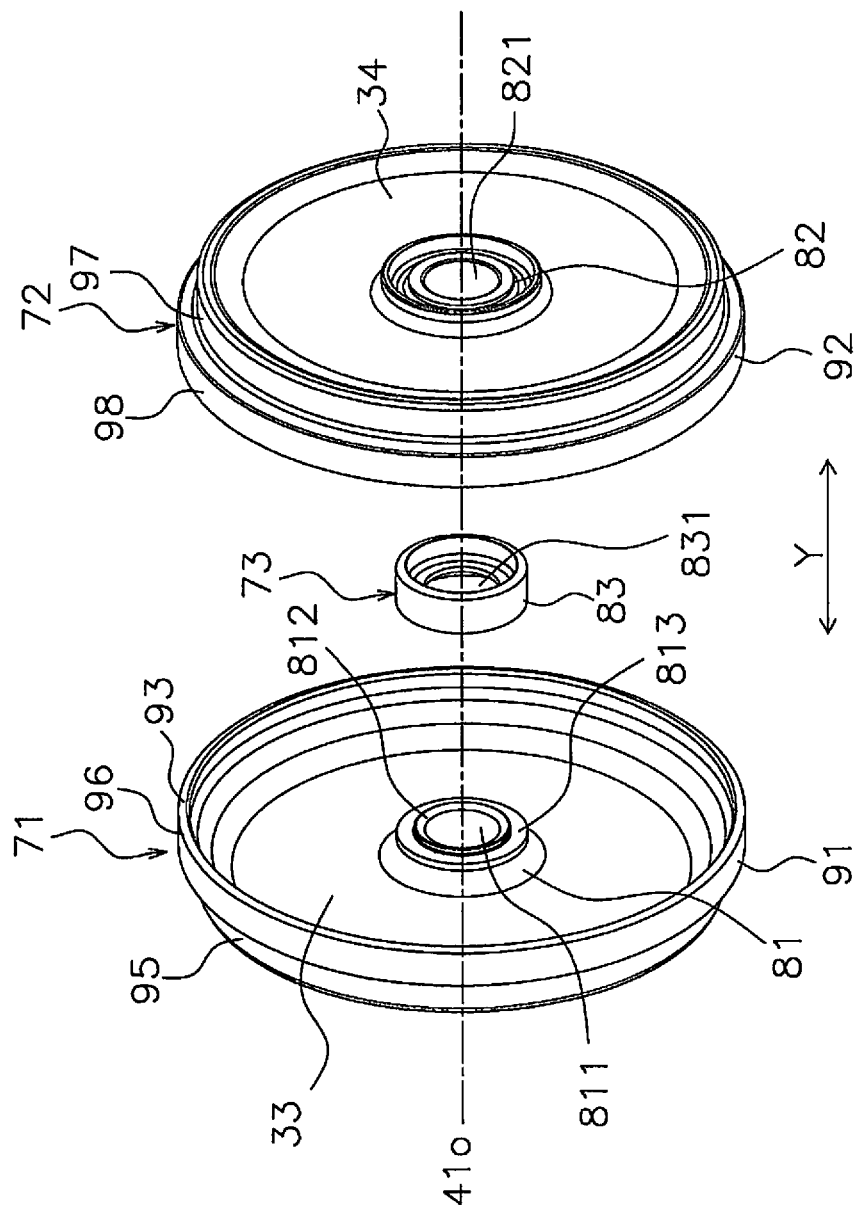
FIG. 4 is an exploded oblique view of the idler in FIG. 2.
Figure 5:
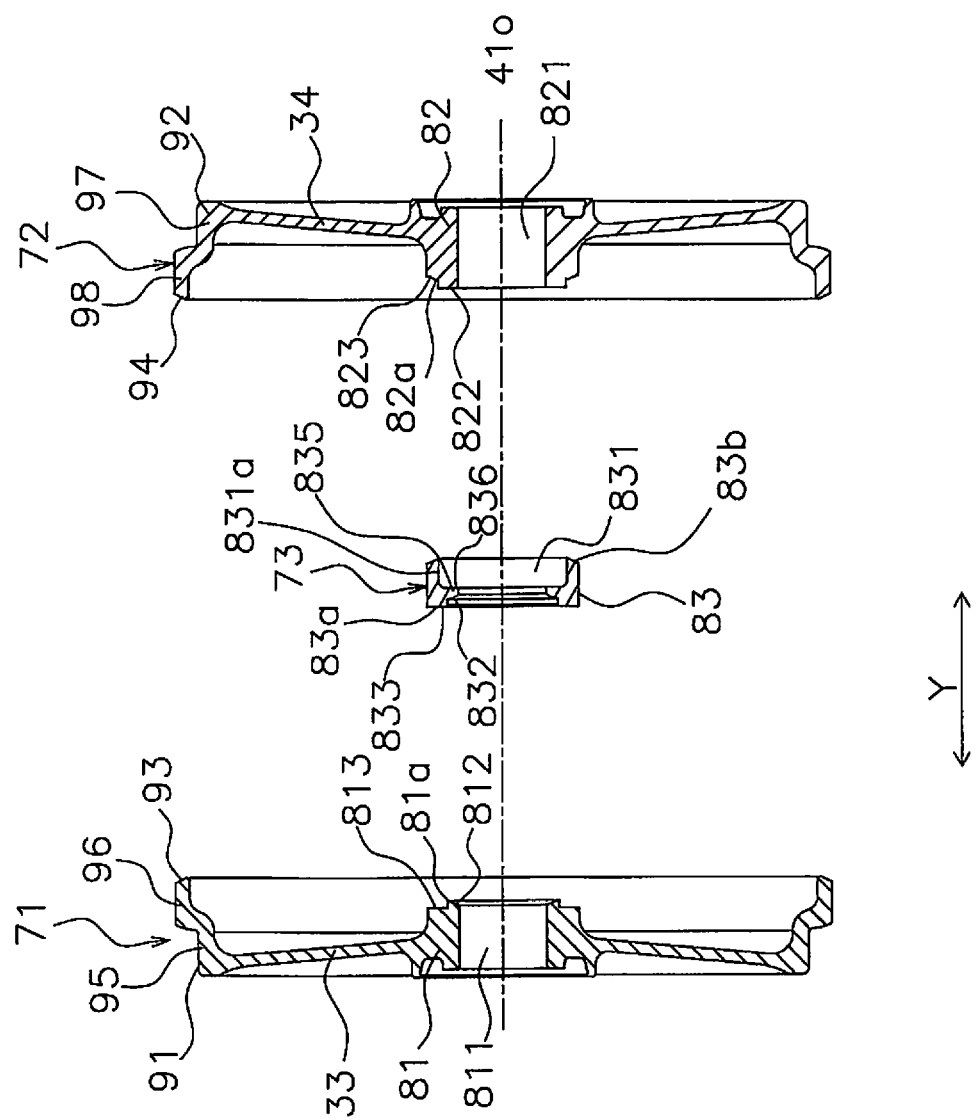
FIG. 5 is an exploded cross section of the idler in FIG. 3.

Next, the first member 71, the second member 72, and the third member 73 will be described. FIG. 4 is an exploded oblique view of the idler 22. FIG. 5 is an exploded cross section of the idler 22.

a. First Member

The first member 71 is a member on the left side shown in FIG. 3A. As shown in FIGS. 4 and 5, the first member 71 includes a first boss portion 81 that is a part of the boss 31, a first rim portion 91 that is a part of the rim 32, and the side plate 33.

The first boss portion 81 is provided with a first axle hole portion 811 that forms part of the axle hole 41. A step is formed on the end face 81a that is on the inside (the second member 72 side) in the left and right direction Y in the center axis 41o direction of the first boss portion 81. More precisely, an annular inner peripheral side portion 812 at the peripheral edge of the first axle hole portion 811 of the end face 81a protrudes beyond the annular outer peripheral side portion 813. Also, the inner peripheral side portion 812 is formed in a tapered shape that faces outward in the left and right direction Y moving toward the inner peripheral side. The outer peripheral side portion 813 is formed perpendicular to the center axis 41o.

On the end face 93 on the second member 72 side of the first rim portion 91 is formed a tapered shape that faces outward in the left and right direction Y moving toward the outer peripheral side.

The first rim portion 91 has a contact face forming component 95 disposed on the outside in the left and right direction Y, and a convex portion forming component 96 disposed on the inside of the contact face forming component 95. The contact face forming component 95 forms the above-mentioned contact portion 52. The convex portion forming component 96 forms part of the convex portion 51.

The side plate 33 connects the first rim portion 91 and the first boss portion 81. More precisely, the side plate 33 connects the area near the end on the outside in the left and right direction Y of the first rim portion 91, and the area near of the end on the outside in the left and right direction Y of the first boss portion 81.

b. Second Member

The second member 72 is a member on the right side shown in FIG. 3A. As shown in FIGS. 4 and 5, the second member 72 includes a second boss portion 82 that is part of the boss 31, a second rim portion 92 that is part of the rim 32, and the side plate 34.

The second boss portion 82 is provided with a second axle hole portion 821 that forms part of the axle hole 41. A step is formed on the end face 82a that is on the inside (the first member 71 side) in the center axis 41o direction of the second boss portion 82. More precisely, an annular inner peripheral side portion 822 at the peripheral edge of the second axle hole portion 821 of the end face 82a protrudes beyond an annular outer peripheral side portion 823. Also, the outer peripheral side portion 823 is formed in a tapered shape that faces outward in the left and right direction Y moving toward the outer peripheral side. The inner peripheral side portion 822 is formed perpendicular to the center axis 41o.

On the end face 94 on the first member 71 side of the second rim portion 92 is formed a tapered shape that faces outward in the left and right direction Y moving toward the outer peripheral side.

The second rim portion 92 has a contact face forming component 97 disposed on the outside in the left and right direction Y, and a convex portion forming component 98 disposed on the inside of the contact face forming component 97. The contact face forming component 97 constitutes the above-mentioned contact portion 53. The convex portion forming component 98 constitutes part of the convex portion 51. The convex portion forming component 98 and the convex portion forming component 96 constitute the convex portion 51.

The side plate 34 connects the second rim portion 92 and the second boss portion 82. More precisely, the side plate 34 connects the area near the end on the outside in the left and right direction Y of the second rim portion 92, and the area near the end on the outside in the left and right direction Y of the second boss portion 82.

c. Third Member

The third member 73 is a member in the center shown in FIG. 3A. As shown in FIGS. 4 and 5, the third member 73 includes a third boss portion 83 that is part of the boss 31. The third member 73 is provided with a third axle hole portion 831 that forms the axle hole 41. In the third axle hole portion 831 of the third member 73 is formed a protruding portion 835 that protrudes inward.

A step is formed on the end face 83*a* of the third member 73 on the first member 71 side. More precisely, an annular inner peripheral side portion 832 at the peripheral edge of the third axle hole portion 831 of the end face 83*a* is located more to the inside than the annular outer peripheral side portion 833. The outer peripheral side portion 833 is disposed more to the outside (the first member 71 side) than the inner peripheral side portion 832. The inner corner of the inner peripheral side portion 832 is formed in a tapered shape that faces inward moving toward the inner peripheral side. The outer peripheral side portion 833 is formed perpendicular to the center axis 41*o*. The inner peripheral side portion 832 is a face on the first member 71 side of the protruding portion 835.

Also, the inner peripheral face 836 on the second member 72 side of the protruding portion 835 constitutes the inner side face 42*a* of the above-mentioned oil reservoir 42. The hole portion 831*a* closer to the second member 72 than the protruding portion 835 of the third axle hole portion 831 constitutes the bottom face 42*c* of the oil reservoir 42. The inner peripheral side portion 822 of the end face 82*a* of the second member 72 constitutes the inner side face 42*b* of the oil reservoir 42. Thus, a part of the oil reservoir 42 is formed in the third member 73, and the other portion is formed in the second member 72.

The end face 83*ba* on the second member 72 side of the third member 73 is formed in an annular shape, and is formed in a tapered shape that faces inward in the left and right direction Y moving toward the outer peripheral side.

D. Assembly

As shown in FIGS. 3A and 5, the third member 73 and the second member 72 are put together such that the end face 83*b* of the third member 73 is disposed more to the outside than the inner peripheral side portion 822 of the end face 82*a* of the second member 72 and the end face 83*b* is opposite the outer peripheral side portion 823.

Also, the inner peripheral side portion 812 of the end face 81*a* of the first member 71 is put together with the end face 83*a* of the third member 73. The third member 73 and the first member 71 are put together such that the inner peripheral side portion 812 of the end face 81*a* of the first member 71 is disposed more to the inside than the outer peripheral side portion 833 of the end face 83*a* of the third member 73 and the inner peripheral side portion 812 is opposite the inner peripheral side portion 832.

The first member 71 and the second member 72 are put together so that the end face 93 of the first member 71 and the end face 94 of the second member 72 will be either in contact with each other or positioned close to each other.

As shown in FIGS. 3A and 5, welding is performed between the tapered shape of the end face 83*b* of the third member 73 and the tapered shape of the outer peripheral side portion 823 of the second member 72 to form the first welded portion 61.

Welding is also performed between the tapered shape of the inner peripheral side portion 832 of the third member 73 and the tapered shape of the inner peripheral side portion 812 of the first member to form the second welded portion 62.

Welding is also performed between the tapered shape of the end face 93 of the first member 71 and the tapered shape of the end face 94 of the second member 72 to form the third welded portion 63.

2. Idler Manufacturing Method

Next, the method for manufacturing the idler 22 of Embodiment 1 will be described.

Figure 6:
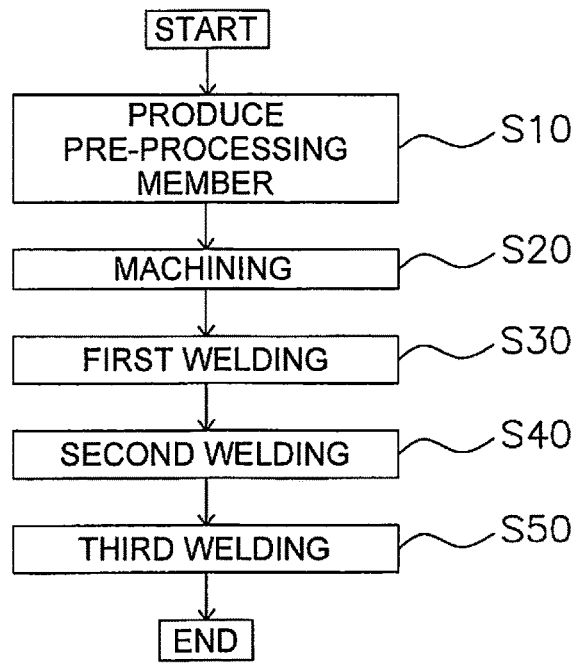
FIG. 6 is a flowchart of a method for manufacturing the idler in FIG. 2.

FIG. 6 is a flowchart showing the method for manufacturing the idler 22. FIGS. 7 to 10 are simplified cross sections of the members, and illustrate the method for manufacturing the idler 22.

Figure 7:
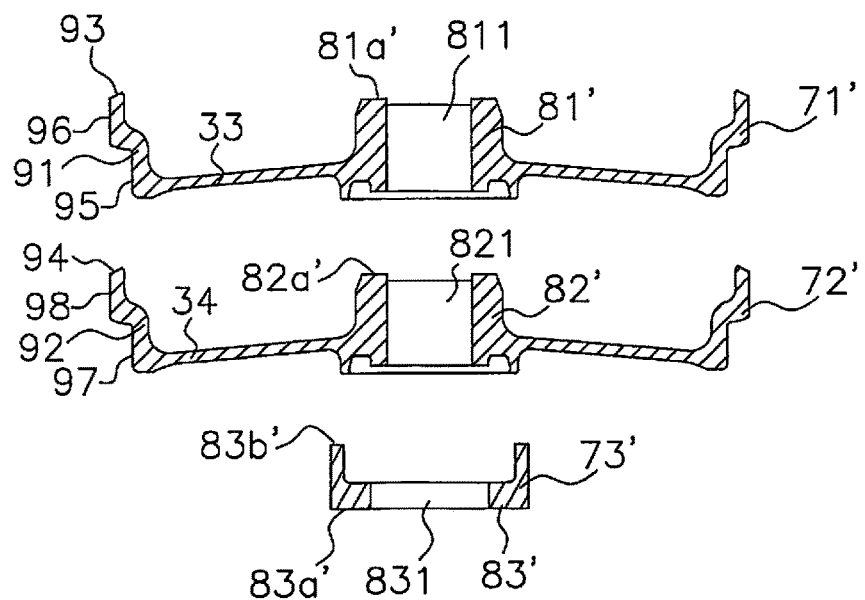
FIG. 7 is a cross section of a first member, a second member, and a third member, and illustrates the method for manufacturing the idler in FIG. 2.

First, in step S10, as shown in FIG. 7, a first pre-processing member 71' for forming the first member 71, a second pre-processing member 72' for forming the second member 72, and a third pre-processing member 73' for forming the third member 73 are produced by casting or forging. Here, since the first pre-processing member 71' and the second pre-processing member 72' have the same shape, they can be produced with a single die.

The first pre-processing member 71' differs from the first member 71 in that no step is formed on the end face 81*a*' of a first boss portion 81', and this end face 81*a*' is formed flat.

The second pre-processing member 72' differs from the second member 72 in that no step is formed on the end face 82*a*' of a second boss portion 82', and this end face 82*a*' is formed flat.

The third pre-processing member 73' differs from the third member 73 in that no step is formed on the end face 83*a*' of a third boss portion 83', and this end face 83*a*' is formed flat. Also, the end face 83*b*' of the third boss portion 83' differs from the end face 83*b* in that it is not tapered.

Figure 8:
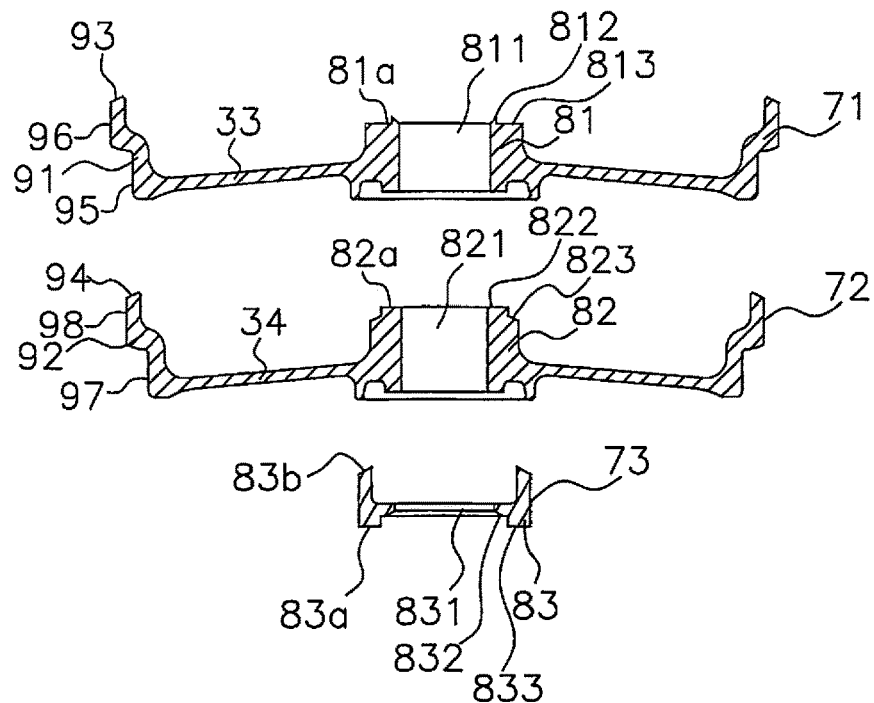
FIG. 8 is a cross section of a first member, a second member, and a third member, and illustrates the method for manufacturing the idler in FIG. 2.

Next, in step S20, the first member 71 is produced as shown in FIG. 8 by machining the first pre-processing member 71'. The end face 81*a*, which has the inner peripheral side portion 812 and the outer peripheral side portion 813, is produced mainly by forming a step on the end face 81*a*' of the first boss portion 81' and tapering the inner peripheral side portion.

Also, the second member 72 is produced by machining the second pre-processing member 72'. The end face 82*a*, which has the inner peripheral side portion 822 and the outer peripheral side portion 823, is produced mainly by forming a step on the end face 82*a*' of the second boss portion 82' and tapering the outer peripheral side portion. Also, the third member 73 is produced by machining the third pre-processing member 73'.

The end face 83*a*, which has the inner peripheral side portion 832 and the outer peripheral side portion 833, is produced mainly by forming a step on the end face 83*a*' of the third boss portion 83' and tapering the corner of the inner peripheral side portion. Also, the end face 83b' is tapered, and the end face 83b is produced.

Figure 9:
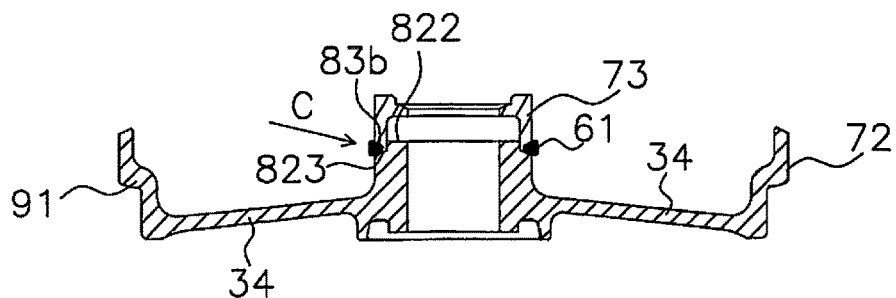
FIG. 9 is a cross section of a first member, a second member, and a third member, and illustrates the method for manufacturing the idler in FIG. 2.

As shown in FIG. 9, in step S30, the third member 73 and the second member 72 are put together and welded such that the end face 83b of the third member 73 is disposed more to the outside than the inner peripheral side portion 822 of the end face 82a of the second member 72, and is opposite outer peripheral side portion 823. Welding is performed all the way around and from the outside between the tapered shape of the end face 83b of the third member 73 and the tapered shape of the outer peripheral side portion 823 of the second member 72 to form the first welded portion 61. The arrow C shown in FIG. 9 indicates the direction in which the welding torch is brought closer to the second member 72 and the third member 73.

Figure 10:
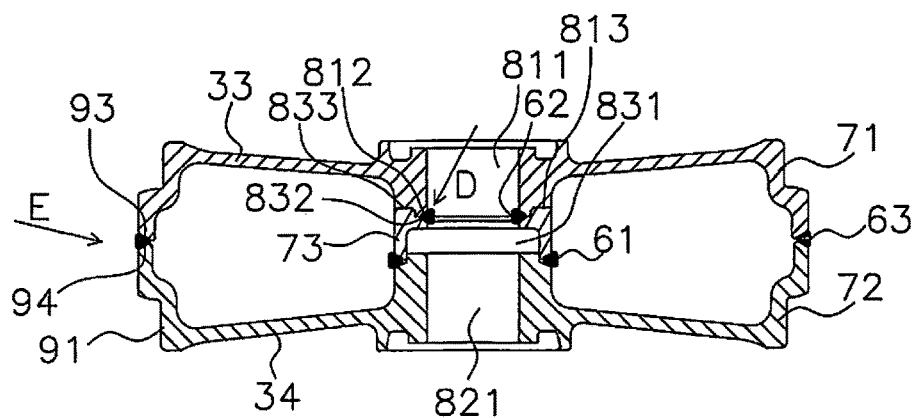
FIG. 10 is a cross section of a first member, a second member, and a third member, and illustrates the method for manufacturing the idler in FIG. 2.

As shown in FIG. 10, in step S40, the first member 71 and the third member 73 are put together so that the inner peripheral side portion 812 of the end face 81a of the first member 71 goes in on the inside of the outer peripheral side portion 833 of the end face 83a of the third member 73, and is opposite the inner peripheral side portion 832. Also, the first member 71 and the second member 72 are put together so that the end face 93 of the first member 71 and the end face 94 of the second member 72 are in contact with each other or are positioned close to each other. Welding is performed between the first member 71 and the third member 73 in this state.

Welding is performed all the way around and from the inside between the tapered shape of the inner peripheral side portion 832 of the third member 73 and the tapered shape of the inner peripheral side portion 812 of the first member 71 to form the second welded portion 62. In forming the second welded portion 62, the welding torch is inserted from the inside of the first axle hole portion 811 and the third axle hole portion 831, as indicated by the arrow D in FIG. 10.

As shown in FIG. 10, in step S50 welding is performed all the way around and from the outside between the tapered shape of the end face 93 of the first member 71 and the tapered shape of the end face 94 of the second member 72 to form the third welded portion 63. The arrow E shown in FIG. 10 indicates the direction in which the welding torch is brought closer to the second member 72 and the third member 73. The idler 22 can be manufactured as described above.

Embodiment 2

The idler 122 according to Embodiment 2 of the present invention will now be described. The idler 122 of Embodiment 2 has the same basic configuration as the idler 22 of Embodiment 1, but the second member and the third member joined by welding have a different shape. Therefore, the description will focus on this difference. Also, components that are the same will be numbered the same.

Figure 11:
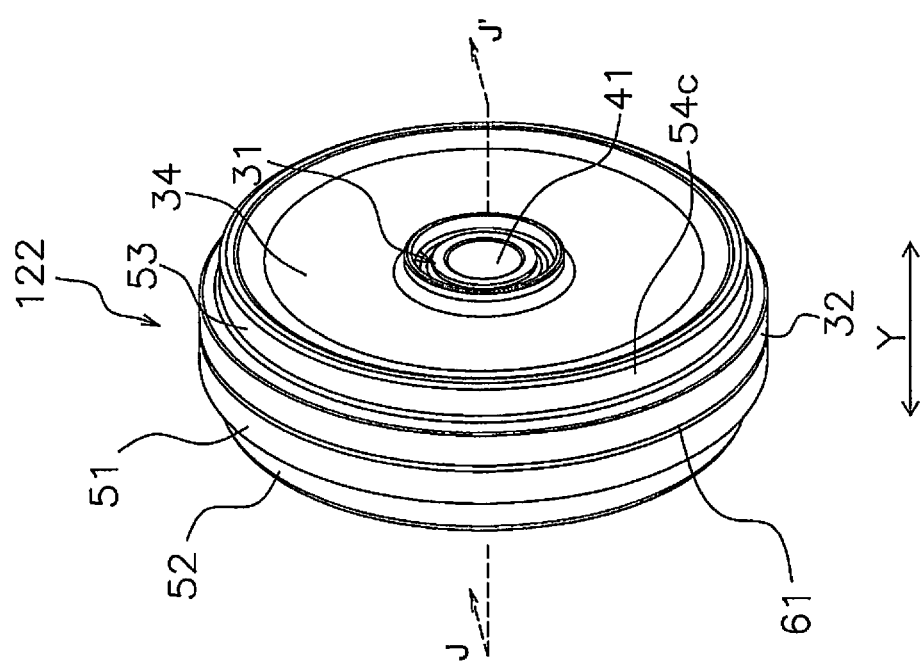
FIG. 11 is an oblique view of an idler in a second embodiment of the present invention.
Figure 12:
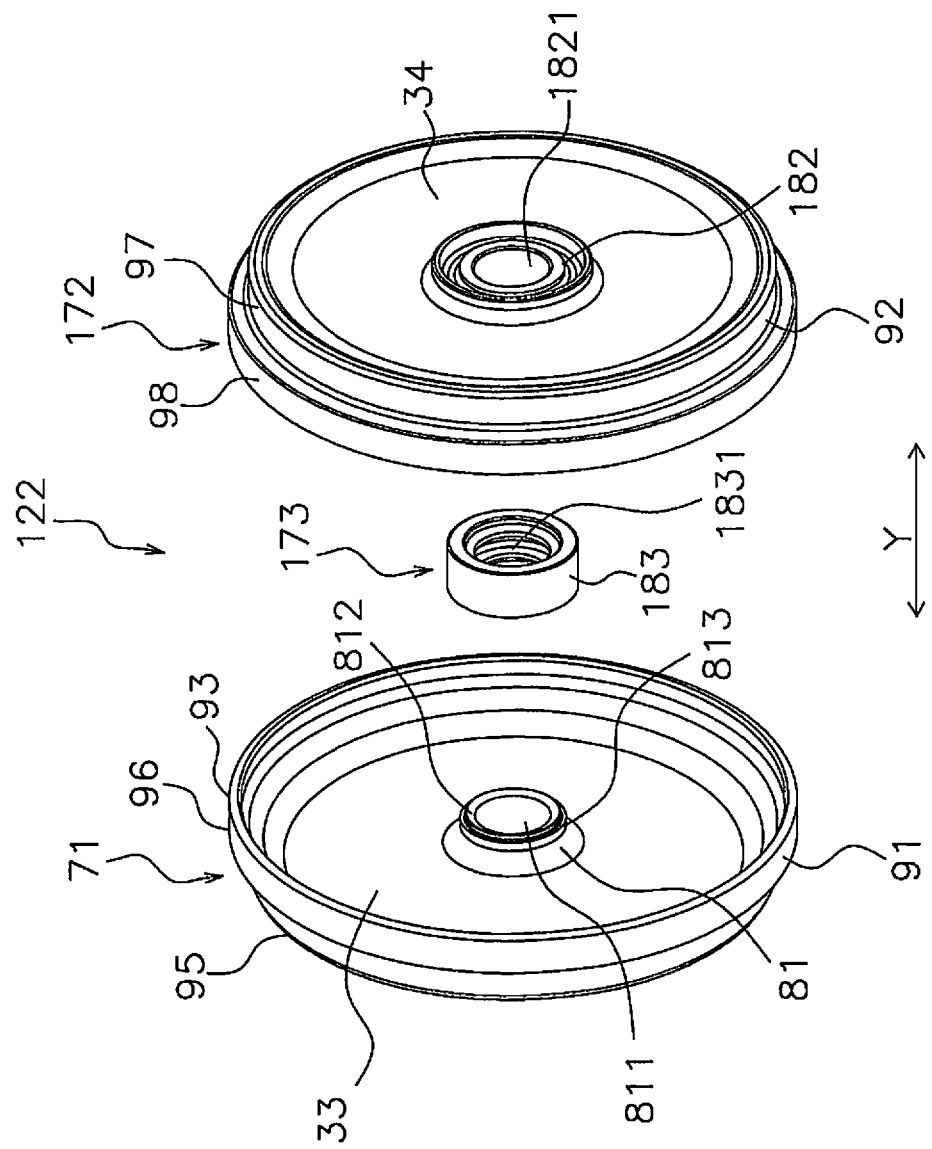
FIG. 12 is an exploded oblique view of the idler in FIG. 11.
Figure 13:
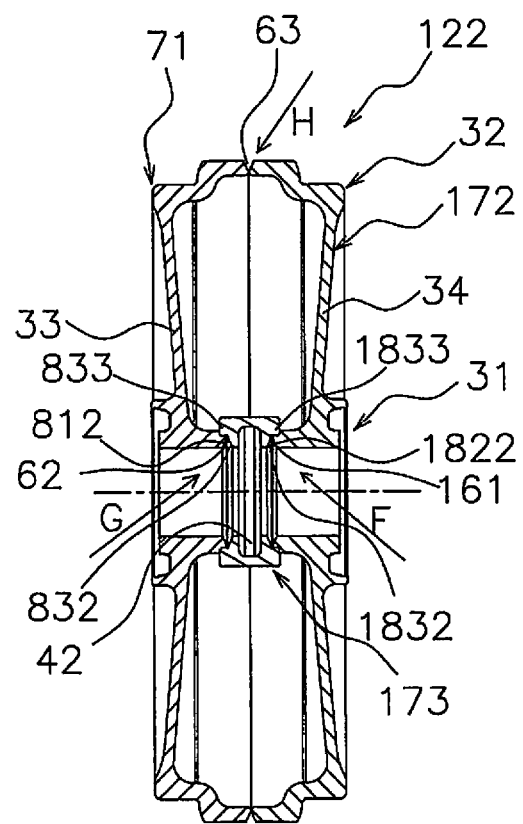
FIG. 13 is a cross section along the J-J' line in FIG. 11.
Figure 14:
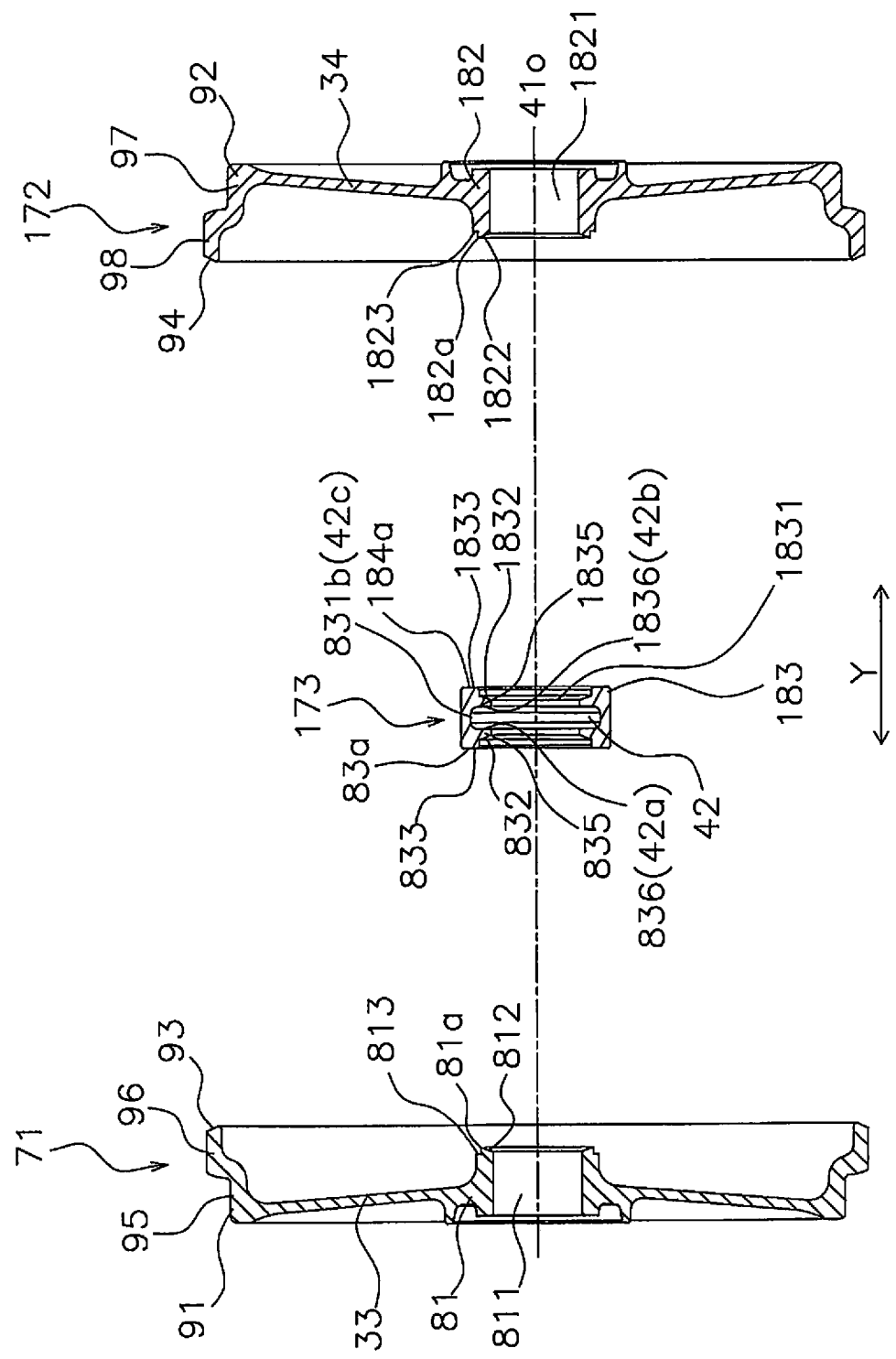
FIG. 14 is an exploded cross section of FIG. 13.

FIG. 11 is an oblique view of the idler 122 in Embodiment 2, and FIG. 12 is an exploded oblique view of FIG. 11. FIG. 13 is a cross section along the arrow J-J' line in FIG. 11. FIG. 14 is an exploded cross section of FIG. 13.

As shown in FIG. 11, the idler 122 in Embodiment 2 looks the same as the idler 22 in Embodiment 1.

As shown in FIGS. 12 and 13, the idler 122 is similar to the idler 22 in Embodiment 1 in that the idler 122 has a boss 31, a rim 32, and a pair of side plates 33 and 34. As shown in FIGS. 12 and 13, the idler 122 in Embodiment 2 is made up of three members, namely, a first member 71, a second member 172, and a third member 173. The first member 71 has the same configuration as the first member 71 in Embodiment 1.

The second member 172 is configured the same as the first member 71. As shown in FIG. 14, the second member 172 differs from the second member 72 in Embodiment 1 in that a circular inner peripheral side portion 1822 at the peripheral edge of a second axle hole portion 1821 of the end face 182a on the first member 71 side of a second boss portion 182 protrudes beyond a circular outer peripheral side portion 1823. Also, the inner peripheral side portion 1822 is formed in a tapered shape facing outward in the left and right direction Y moving toward the inner peripheral side. The outer peripheral side portion 1823 is formed perpendicular to the center axis 41o.

Unlike the third member 73 in Embodiment 1, the third member 173 is formed in a left and right symmetry. The third member 73 includes a third boss portion 183, which is part of the boss 31. The third member 173 is provided with a third axle hole portion 1831 that forms the axle hole 41. In the third axle hole portion 1831 of the third member 73, a protruding portion 835 and a protruding portion 1835 protruding inward are formed in the circumferential direction with a specific spacing in between them.

Also, a step is formed on the end face 83a on the first member 71 side of the third member 173. More precisely, the circular inner peripheral side portion 832 at the peripheral edge of the third axle hole portion 831 of the end face 83a is located more to the inside than the circular outer peripheral side portion 833. The outer peripheral side portion 833 is disposed more to the outside (the first member 71 side) than the inner peripheral side portion 832. The inner corner of the inner peripheral side portion 832 is formed in a tapered shape. The outer peripheral side portion 833 is formed perpendicular to the center axis 41o. This inner peripheral side portion 832 is a face on the first member 71 side of the protruding portion 835. Also, the inner peripheral face 836 on the second member 72 side of the protruding portion 835 constitutes the inner side face 42a of the above-mentioned oil reservoir 42.

A step is formed on the end face 184a on the second member 172 side of the third member 173. More precisely, the circular inner peripheral side portion 1832 at the peripheral edge of the third axle hole portion 831 of the end face 184a is located more to the inside than the circular outer peripheral side portion 1833. The outer peripheral side portion 1833 is disposed more to the outside (the first member 71 side) than the inner peripheral side portion 1832. The inner corner of the inner peripheral side portion 1832 is formed in a tapered shape that faces inward moving toward the inner peripheral side. The outer peripheral side portion 1833 is formed perpendicular to the center axis 41o. This inner peripheral side portion 1832 is a face on the first member 71 side of the protruding portion 1835.

The inner peripheral face 1836 on the second member 172 side of the protruding portion 1835 constitutes the inner side face 42b of the above-mentioned oil reservoir 42.

Of the inner peripheral face of the third axle hole portion 831, the portion 831b between the two protruding portions 835 and 1835 constitutes the bottom face 42c of the oil reservoir 42. Thus, in Embodiment 2, the oil reservoir 42 is formed in the third member 173.

As shown in FIGS. 12 and 13, when the idler 122 configured as above is produced, the first member 71 and the third member 73 are put together so that the inner peripheral side portion 812 of the first member 71 goes in on the inside of the outer peripheral side portion 833 of the third member 73, and is opposite the inner peripheral side portion 832.

The second member 172 and the third member 173 are put together so that the inner peripheral side portion 1822 of the second member 172 goes in on the inside of the outer peripheral side portion 1833 of the third member 73 and is opposite the inner peripheral side portion 1832.

As shown in FIG. 13, welding is performed between the tapered shape of the inner peripheral side portion 1832 of the third member 73 and the tapered shape of the inner peripheral side portion 1822 of the second member 172 to form the first welded portion 161.

Welding is also performed between the tapered shape of the inner peripheral side portion 832 of the third member 73 and the tapered shape of the inner peripheral side portion 812 of the first member to form the second welded portion 62.

Welding is also performed between the tapered shape of the end face 93 of the first member 71 and the tapered shape of the end face 94 of the second member 172 to form the third welded portion 63.

As indicated by the arrows F and G in FIG. 13, the first welded portion 161 and the second welded portion 62 are welded from the axle hole 41 side. Also, as indicated by the arrow H, the third welded portion 63 is welded from the outside, just as in Embodiment 1.

The idlers 22 or 122 (examples of an idler wheel) according to these embodiments comprise the first member 71, the second member 72 or 172, the third member 73 or 173, the first welded portion 61 or 161, the second welded portion 62, and the third welded portion 63. The first member 71 has the first boss portion 81 (an example of a first support portion), the first rim portion 91 (an example of a first outer peripheral portion), and the side plate 33 (an example of a first side plate). The first boss portion 81 has the first axle hole portion 811 (an example of a first support hole) into which the axle 27 can be inserted. The first rim portion 91 is formed in an annular shape around the first axle hole portion 811 on the outside in the radial direction of the first boss portion 81. The side plate 33 connects the first rim portion 91 and the first boss portion 81. The second member 72 or 172 has the second boss portion 82 or 182 (an example of a second support portion), the second rim portion 92 (an example of a second outer peripheral portion), and the side plate 34 (an example of a second side plate). The second boss portion 82 or 182 has the second axle hole portion 821 or 1821 (an example of a second support hole) into which the axle 27 can be inserted. The second rim portion 92 is formed in an annular shape around the second axle hole portion 821 or 1821 (an example of a second support hole) on the outside in the radial direction of the second boss portion 82 or 182. The side plate 34 connects the second rim portion 92 and the second boss portion 82 or 182, and is disposed opposite the side plate 33. The third member 73 or 173 has the third boss portion 83 or 183 (an example of a third support portion), which has the third axle hole portion 831 or 1831 (an example of a third support hole) into which the axle 27 can be inserted. The third boss portion 83 or 183 (an example of a third support portion) is disposed between the first boss portion 81 and the second boss portion 82 or 182. The first welded portion 61 or 161 is formed between the second boss portion 82 or 182 and the third boss portion 83 or 183, and connects the second boss portion 82 or 182 (an example of the second support portion) and the third boss portion 83 or 183 (an example of a third support portion). The second welded portion 62 is formed between the first boss portion 81 and the third boss portion 83 or 183 and connects the first boss portion 81 and the third boss portion 83 or 183. The third welded portion 63 is formed between the first rim portion 91 and the second rim portion 92, and connects the first rim portion 91 and the second rim portion 92.

Since the first welded portion 61 or 161, the second welded portion 62, and the third welded portion 63 are all formed on a face running along the direction of the center axis 41o, when a force is exerted in the direction running along the axle 27, a force is applied in the direction in which the welded portions 61 or 161, 62, and 63 are compressed. Therefore, the load exerted on the welded portions 61 or 161, 62, and 63 with respect to the force in the direction along the axle 27 can be reduced.

The idler 22 or 122 (an example of an idler wheel) according to these embodiments comprises the boss 31 (an example of a support component) and the rim 32 (an example of an outer peripheral portion). The boss 31 has the axle hole 41 (an example of a support hole) into which the axle 27 can be inserted. The first axle hole portion 811 (an example of a first support hole), the second axle hole portions 821 or 1821 (an example of a second support hole), and the third axle hole portions 831 or 1831 (an example of a third support hole) are each a part of the axle hole 41 (an example of a support hole). The first boss portion 81 (an example of a first support portion), the second boss portions 82 or 182 (an example of a second support portion), and the third boss portions 83 or 183 (an example of a third support portion) are each a part of the boss 31 (an example of a support component). The first rim portion 91 (an example of a first outer peripheral portion) and the second rim portion 92 (an example of a second outer peripheral portion) are each a part of the rim 32 (an example of an outer peripheral portion).

Thus, the configurations of the idlers 22 or 122 can be formed by welding the three members at the three welded portions.

With the idlers 22 or 122 (an example of an idler wheel) according to these embodiments, the boss 31 (an example of a support component) further has the oil reservoir 42 formed in a concave shape on the inner peripheral face 44 of the axle hole 41 (an example of a support hole).

Consequently, lubricating oil allows the idler 22 or 122 (an example of an idler wheel) to be smoothly rotated with respect to the axle 27.

With the idlers 22 or 122 (an example of an idler wheel) according to these embodiments, at least part of the oil reservoir 42 is formed in the third boss portion 83 or 183 (an example of a third support portion).

Consequently, the oil reservoir 42 can be formed by welding the three members at the three welded portions.

With the idler 22 (an example of an idler wheel) according to this embodiment, at least part of the oil reservoir 42 is formed in the first boss portion 81 (an example of a first support portion).

Consequently, the oil reservoir 42 is formed by the first boss portion 81 and the third boss portion 83.

With the idler 22 (an example of an idler wheel) according to this embodiment, the oil reservoir 42 has an inner side face 42a (an example of a first inner side face), an inner side face 42b (an example of a second inner side face), and a bottom face 42c. The inner side face 42a and the inner side face 42b are opposite each other in the direction of the center axis 41o of the axle hole 41 (an example of a supporting hole). The bottom face 42c extends along the center axis 41o direction. The oil reservoir 42 is provided between the side plate 33 (an example of a first side plate) and the side plate 34 (an example of a second side plate) in the center axis 41o direction. The inner side face 42a (the first inner side face) and the bottom face 42c are provided to the third boss portion 83 (an example of a third support portion). The inner side face 42b (an example of a second inner side face) is provided to the second boss portion 82 (an example of a second support portion).

The shape of the third boss portion 83 allows the third boss portion 83 to be manufactured not only by casting but also by forging, and since the third boss portion is relatively small in size, it can be manufactured at lower cost.

With the idler 22 (an example of an idler wheel) according to this embodiment, the first welded portion 61 is formed on the outer peripheral face 43 side of the boss 31 (an example of a support component). The second welded portion 62 is formed on the inner peripheral face 44 side of the boss 31 (an example of a support component). The third welded portion 63 is formed on the outer peripheral face 54 side of the rim 32 (an example of an outer peripheral portion).

The idler 22 can be formed by performing the welding in this manner. Also, since there is only one place where welding is performed from the inside of the axle hole 41, manufacture will take less time.

With the idlers 22 or 122 (an example of an idler wheel) according to these embodiments, as shown in FIG. 3A, the second welded portion 62 is provided closer to the end than the center position P1 in the direction of the center axis 41o of the axle hole 41 (an example of a supporting hole).

Consequently, in welding the second welded portion 62 from the inside of the axle hole 41, the distance from the opening of the axle hole 41 is shorter, so welding can be performed more easily.

The method for manufacturing the idlers 22 or 122 (an example of an idler wheel) according to these embodiments comprises the step S30 (an example of a first welding step), the step S40 (an example of a second welding step), and the step S50 (an example of a third welding step). The idler 22 or 122 (an example of an idler wheel) has the first member 71, the second member 72 or 172, and third member 73 or 173. The first member 71 has the first boss portion 81 (an example of a first support portion), the first rim portion 91 (an example of a first outer peripheral portion), and the side plate 33 (an example of a first side plate). The first boss portion 81 is provided to the boss 31 (an example of a support component). The boss 31 has the axle hole 41 (an example of a support hole). The first rim portion 91 is provided to the rim 32 (an example of an outer peripheral portion). The rim 32 is formed in an annular shape around the axle hole 41 on the outside of the boss 31. The side plate 33 connects the first rim portion 91 and the first boss portion 81. The second member 72 or 172 has the second boss portion 82 or 182 (an example of a second support portion), the second rim portion 92 (an example of a second outer peripheral portion), and the side plate 34 (an example of a second side plate). The second boss portion 82 or 182 is provided to the boss 31. The second rim portion 92 is provided to the rim 32. The side plate 34 connects the second rim portion 92 and the second boss portion 82 or 182 and is disposed opposite the side plate 33 in the direction of the center axis 41o of the axle hole 41. The third member 73 or 173 is provided to the boss 31 and has the third boss portion 83 or 183 disposed between the first boss portion 81 and the second boss portion 82 or 182. Step S30 involves welding the second member 72 or 172 and the third member 73 or 173 between the second boss portion 82 or 182 and the third boss portion 83 or 183. In step S40, the first member 71 and the third member 73 or 173 are welded between the first boss portion 81 and the third boss portion 83 or 183. Step S50 involves welding the first member 71 and the second member 72 or 172 between the first rim portion 91 and the second rim portion 92.

Since the first welded portion 61 or 161, the second welded portion 62, and the third welded portion 63 are all formed on a face running along the direction of the center axis 41o, when a force is exerted in the direction running along the axle 27, a force is applied in a direction in which the welded portions 61 or 161, 62, and 63 are compressed. It is therefore possible to reduce the load exerted on the welded portions 61 or 161, 62, and 63 with respect to the force in the direction along the axle 27.

With the method for manufacturing the idler 22 or 122 (an example of an idler wheel) according to this embodiment, step S30 (an example of a first welding step) is performed from outside the boss 31 (an example of a support component). Step S40 (an example of a second welding step) is performed from inside the boss 31 (an example of a support component). Step S50 (an example of a third welding step) is performed from outside the rim 32 (an example of an outer peripheral portion).

The idler 22 can be formed by performing the welding in this manner. Also, since there is only one place where the welding is performed from the inside of the axle hole 41 of the boss 31, manufacture takes less time.

With the method for manufacturing the idler 22 (an example of an idler wheel) according to this embodiment, the boss 31 (an example of a support component) has the oil reservoir 42, which is formed in a concave shape on the inner peripheral face 44 of the axle hole 41 (an example of a support hole).

Consequently, lubricating oil allows the idler 22 or 122 (an example of an idler wheel) to be smoothly rotated with respect to the axle 27.

With the method for manufacturing the idler 22 (an example of an idler wheel) according to this embodiment, the oil reservoir 42 has the inner side face 42a (an example of a first inner side face), the inner side face 42b (an example of a second inner side face), and the bottom face 42c. The inner side face 42a and the inner side face 42b are opposite each other in the direction of the center axis 41o. The bottom face 42c extends along the center axis 41o direction. The oil reservoir 42 is provided between the side plate 33 and the side plate 34 in the center axis 41o direction. The inner side face 42a and the bottom face 42c are provided to the third boss portion 83. The inner side face 42b is provided to the second boss portion 82.

Because of the shape of the third boss portion 83, the third member 73 can be manufactured not only by casting but also by forging, and since the third member 73 is relatively small in size, it can be manufactured at lower cost.

Embodiments of the present invention are described above, but the present invention is not limited to or by the above embodiments, and various modifications are possible without departing from the gist of the invention.

In Embodiment 1, after the second welded portion 62 has been welded in step S40, the third welded portion 63 is welded in step S50, but the order is not limited to this, and may be reversed.

In Embodiment 2, the welding may be performed from any of the first welded portion 161, the second welded portion 62, and the third welded portion 63.

In the above embodiments, a hydraulic excavator was described as an example of a work vehicle having the idlers 22 or 122, but a hydraulic excavator is not the only option, and a bulldozer, a wheel loader, or the like may be used instead. In other words, the present invention can be applied to any work vehicle provided with track-type drive units having idlers.

In the above embodiments, the convex portion 51 of the rim 32 is divided into two members, namely, the first member 71 and the second member 72 (the second member 172 in Embodiment 2), but this is not the only option. For example, the contact portions 52 and 53 may be divided into two members.

In the above embodiments, the third member 73 and the third boss portion 83 have the same shape, but the third member 73 may have a portion other than the third boss portion 83. Also, the third member 173 and the third boss portion 183 have the same shape, but the third member 173 may have a portion other than the third boss portion 183.

The idler wheel and the method for manufacturing an idler wheel according to the present invention have the effect of allowing a reduction in the load exerted on the welded portions with respect to the force in the axle direction, and are useful for track-type drive units used in hydraulic excavators and the like.

The invention claimed is:

1. An idler wheel, comprising:
a first member including a first support portion having a first support hole configured to allow insertion of an axle, a first outer peripheral portion formed in an annular shape around the first support hole on an outside in a radial direction of the first support portion, and a first side plate connecting the first outer peripheral portion and the first support portion;
a second member including a second support portion having a second support hole configured to allow insertion of the axle, a second outer peripheral portion formed in an annular shape around the second support hole on an outside in an radial direction of the second support portion, and a second side plate connecting the second outer peripheral portion and the second support portion, the second side plate being disposed opposite the first side plate;
a third member including a third support portion having a third support hole configured to allow insertion of the axle, the third member being disposed between the first support portion and the second support portion;
a first welded portion formed between the second support portion and the third support portion, the first welded portion connecting the second support portion and the third support portion;
a second welded portion formed between the first support portion and the third support portion, the second welded portion connecting the first support portion and the third support portion; and
a third welded portion formed between the first outer peripheral portion and the second outer peripheral portion, the third welded portion connecting the first outer peripheral portion and the second outer peripheral portion.

2. The idler wheel according to claim 1, further comprising
a support component including a support hole configured to allow insertion of the axle, and an outer peripheral component formed in an annular shape around the support hole on an outside in a radial direction of the support portion,
each of the first support hole, the second support hole, and the third support hole being a part of the support hole,
each of the first support portion, the second support portion, and the third support portion being a part of the support component, and
each of the first outer peripheral portion and the second outer peripheral portion being a part of the outer peripheral component.

3. The idler wheel according to claim 2, wherein
the support component further includes an oil reservoir formed in a concave shape on an inner peripheral face of the support hole.

4. The idler wheel according to claim 3, wherein
at least part of the oil reservoir is formed in the third support portion.

5. The idler wheel according to claim 4, wherein
at least part of the oil reservoir is formed in the first support portion.

6. The idler wheel according to claim 5, wherein
the oil reservoir includes
a first inner side face and a second inner side face opposite each other in a center axial direction of the support hole; and
a bottom face running along the center axial direction,
the oil reservoir is provided between the first side plate and the second side plate in the central axial direction,
the first inner side face and the bottom face are provided to the third support portion, and
the second inner side face is provided to the second support portion.

7. The idler wheel according to claim 2, wherein
the first welded portion is formed on an outer peripheral face side of the support component,
the second welded portion is formed on an inner peripheral face side of the support component, and
the third welded portion is formed on an outer peripheral face side of the outer peripheral component.

8. The idler wheel according to claim 7, wherein
the second welded portion is provided closer to an edge than a center position in the center axial direction of the support hole.

9. A method for manufacturing an idler wheel comprising:
a first member including a first support portion provided to a support component having a support hole configured to allow insertion of an axle, a first outer peripheral portion provided to an outer peripheral component formed in an annular shape around the support hole on an outside of the support component, and a first side plate connecting the first outer peripheral portion and the first support portion;
a second member including a second support portion provided to the support component, a second outer peripheral portion provided to the outer peripheral component, and a second side plate connecting the second outer peripheral portion and the second support portion, the second side plate being disposed opposite the first side plate in a central axial direction of the support hole; and
a third member including a third support portion provided to the support component, the third support portion being disposed between the first support portion and the second support portion,
the method comprising:
a first welding step of welding the second member and the third member between the second support portion and the third support portion;
a second welding step of welding the first member and the third member between the first support portion and the third support portion; and a third welding step of welding the first member and the second member between the first outer peripheral portion and the second outer peripheral portion.

10. The method for manufacturing an idler wheel according to claim 9, wherein
the first welding step is performed from an outside of the support component,
the second welding step is performed from an inside of the support component, and
the third welding step is performed from an outside of the outer peripheral component.

11. The method for manufacturing an idler wheel according to claim 9, wherein
the support component includes an oil reservoir formed in a concave shape on an inner peripheral face of the support hole.

12. The method for manufacturing an idler wheel according to claim 11, wherein
the oil reservoir includes
a first inner side face and a second inner side face opposed to each other in the central axial direction; and
a bottom face running along the center axial direction,
the oil reservoir is provided between the first side plate and the second side plate in the central axial direction,
the first inner side face and the bottom face are provided to the third support portion, and
the second inner side face is provided to the second support portion.

* * * * *